June 26, 1945.  J. W. S. HODGDON  2,379,355
PROPELLED AERODYNAMIC BODY
Filed June 5, 1942  2 Sheets-Sheet 2
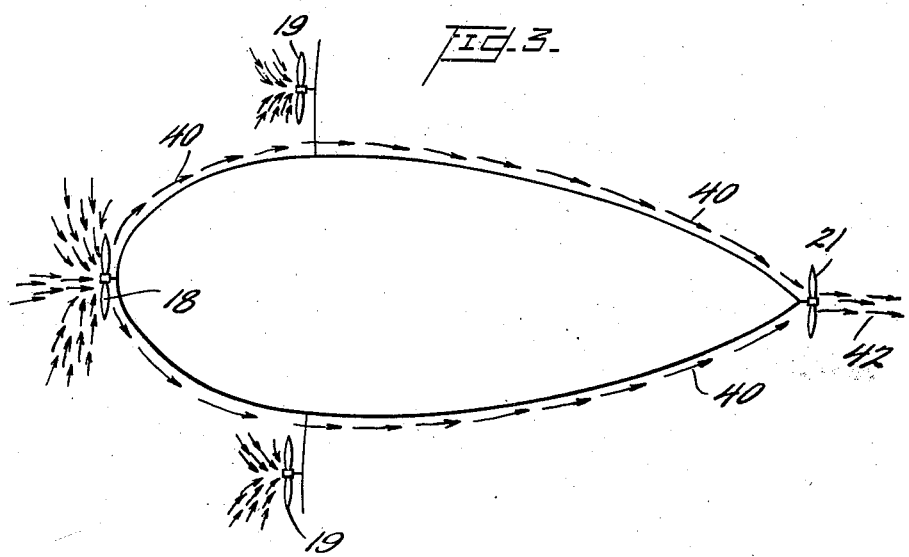
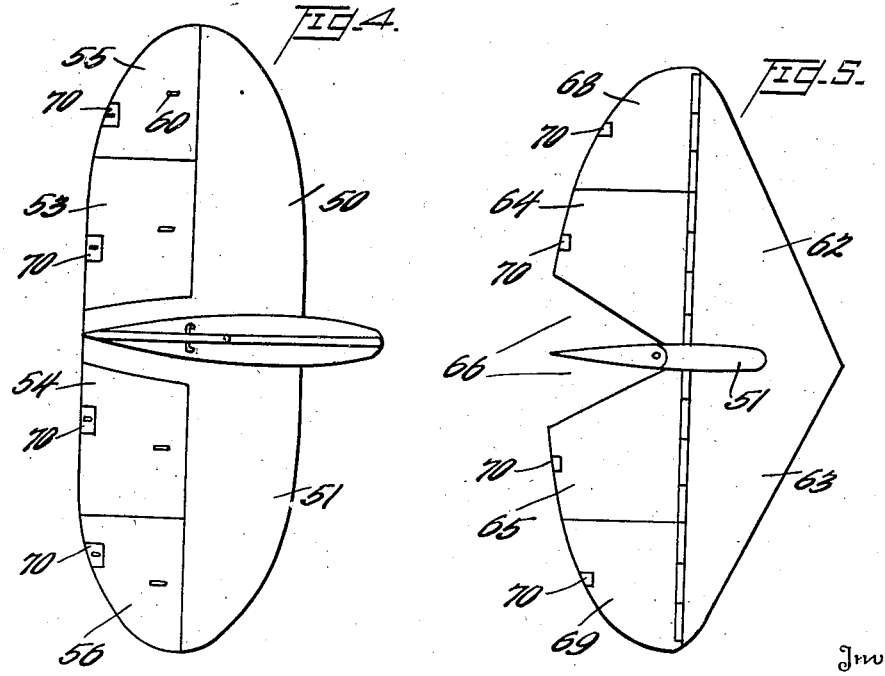
Inventor
John W. S. Hodgdon
By Watson, Cole, Grindle & Watson
Attorney Patented June 26, 1945

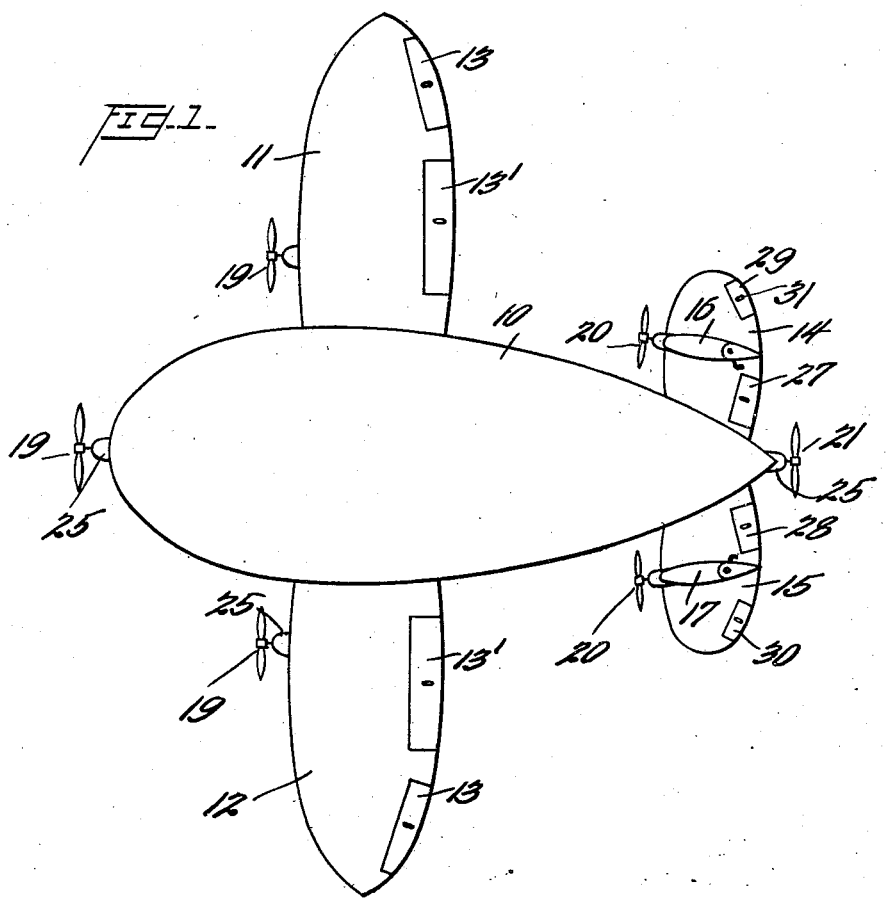
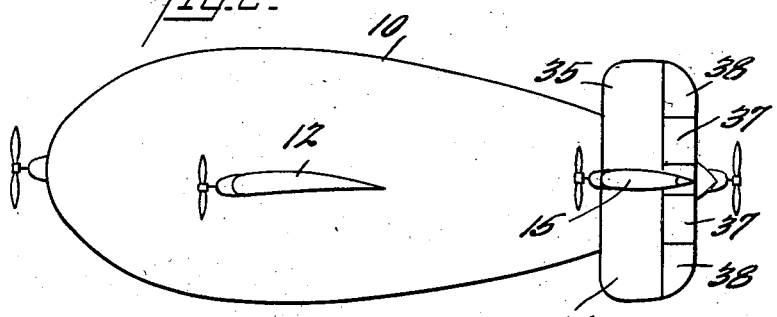

2,379,355

UNITED STATES PATENT OFFICE 2,379,355

PROPELLED AERODYNAMIC BODY

John W. S. Hodgdon, Santa Barbara, Calif., assignor of forty-four per cent to Alice P. Brownrigg, New York, N. Y., and five per cent to Florence E. Parker, Washington, D. C.

Application June 5, 1942, Serial No. 445,904

5 Claims. (Cl. 244—5)

This invention relates to aerodynamic bodies of the propelled type and more particularly to such bodies for use as aircraft for any purpose, for self-propelled, or remote-controlled bombs and the like.

It is a general object of the present invention to provide a novel propelled aerodynamic body capable of greater speeds, higher maneuverability and improved over-all efficiency than those heretofore known and used.

More particularly it is an important object of the invention to provide an aerodynamic body comprising a fuselage of true tear drop design provided with sustaining wings and stabilizer surfaces and equipped with propulsion motors and propellers so disposed in and about the fuselage and surfaces as to provide a substantially continuous rearwardly moving isolating air blanket about the same, whereby enhanced forward speeds are available.

Another object of the invention consists in the disposition of power driven propellers about a tear drop fuselage so as to provide a clinging blanket of air over the whole surface of the same to act in effect as a lubricant between the body and the stationary air through which it passes, whereby greatly increased speed is available without a corresponding increase in power.

Still another object of the invention consists in the provision of improved controls for self-propelled aerodynamic bodies permitting increased maneuverability, greater accuracy of control and the effecting of acrobatics not heretofore possible.

An important feature permitting the achievement of the last mentioned results includes the arrangement of rear stabilizing surfaces provided with both elevators and ailerons each independently controlled, whereby they may be used for normal or acrobatic maneuvering or set in positions to act as brakes for speed retardation on landing, coming out of power dives and the like.

A further important feature contributing to the maneuverability as aforementioned comprises the arrangement of vertical surfaces including both rudders and ailerons or flaps, again independently controllable for maneuvering or for setting in opposition to increase the retardation on landing, diving and the like.

A further object of the invention comprises the arrangement of an aircraft in which the fuselage is of tear drop configuration and provided with compartments capable of holding buoyant gas for partially sustaining the weight of the craft and in which the remainder of the weight is sustained by suitable wing and stabilizer surfaces extending from the fuselage and disposed to support motor driven propellers to assist in maintaining a clinging flow of air over the whole surface of the fuselage.

As an important feature of the combined buoyant and propulsion support is the provision of an explosive gas as the means for providing partial buoyancy where the craft is used as the self-propelled bomb, the explosive or burning effect of the gas being enhanced by the addition of accelerating charges of solid explosives.

Other and further features and objects of the invention will be more apparent to those skilled in the art upon a consideration of the accompanying drawings and following specification wherein are disclosed several embodiments of the invention with the understanding that these may be combined and/or modified to the extent permitted by the scope of the appended claims without departing from the spirit of the invention.

In said drawings:

Figure 1 is a plan view of one form of aircraft constructed according to the present invention, details of construction being omitted for the sake of clarity;

Figure 2 is a side elevation of the same;

Figure 3 is a diagrammatic illustration of the fuselage and associated power driven propellers illustrating the clinging air flow over the surface;

Figure 4 is a plan view of a combined stabilizer rudder assembly differing from that illustrated in Figure 1; and Figure 5 is a side elevation of the same.

Conventional forms of aircraft have in most cases been a gradual development of the earlier so-called "flying machines" and as such have followed certain general structural arrangements found convenient for the mounting of wings, engines, control surfaces and the like. Some effort, of course, has been made to streamline the several associated parts of the aircraft, but sufficient attention has not been accorded the development of all of the parts into an assembled whole which offers not only a minimum of head resistance when traveling at high speed through the air, but which, by virtue of the distribution of the propulsion elements about the same, reduces the skin resistance of the whole craft and develops the air flow about the same in a manner to assist in its forward movement with the minimum of resistance.

In accordance with the present invention there has been developed a type of self-propelled high-speed aircraft which offers the minimum of resistance to forward motion and which at the same time is amenable to control to such an extent that its maneuverability far surpasses that of any known form of aircraft, making it ideal for military aeroplanes and for self-contained automobile type torpedoes and the like where automatic control and/or remote guidance are resorted to to direct the same to an objective.

In its broadest aspect the invention relates to the combination of a fuselage of particular shape, supporting wings, control and stabilizing surfaces, together with the disposition of propulsion units about the craft in such a manner as to achieve not only maximum forward speed but highly increased maneuverability when considered in cooperation with certain improved forms of control devices associated with the several surfaces. Naturally this form of craft is capable of development in a number of forms dependent on the purpose for which it is to be used. It may be developed as an aeroplane for passenger or cargo carrying, for civil or military purposes, making use of the speed of forward movement as the sole source of support for the weight of the same; it may be developed into a self-propelled remotely controlled bomb capable of travelling at high speeds and lofty elevations to great distances for attacking enemy concentrations and carrying a capacity load of high explosives capable of detonation on impact or by remote control, or it may be developed as a combination aeroplane and dirigible balloon in which a portion of the lift is provided by the use of a buoyant gas and the remainder supplied by supporting surfaces reacting with the atmosphere on relative movement therethrough.

For a better understanding of the invention, reference should be had to the accompanying drawings and particularly to Figures 1 and 2 wherein is disclosed one embodiment of the invention largely shown schematically with the complete elimination of structural details which to some extent would obliterate the important features of shape, surface and control disposition, and propeller arrangement. The structural features may well follow more or less conventional lines modified only where necessary to carry out the particular and distinguishing features of the invention.

In said drawings the basic form of aircraft will be seen to comprise a fuselage or closed body 10, a pair of wings 11 and 12, a pair of stabilizing surfaces 14 and 15, a pair of vertical fin surfaces 16 and 17, and a plurality of propellers 18, 19, 19, 20, 20 and 21, all or a part of which may be used in accordance with the purpose for which the craft is designed. The propellers are intended to be driven by suitable sources of power such as the engines 25 associated with the same. No provision is illustrated for housing the pilot and passengers or cargo, but it will be understood that in order to maintain the streamline form of the device everything will be enclosed within the fuselage 10 without the provision of any excrescences or the like on the surface of the same. Obviously the pilot may have a compartment near the front and on the lower side where maximum vision may be given to him by the provision of transparent windows in the customary manner. The speed attainable by aircraft of the type disclosed and their ability to reach tremendous altitudes practically dictates a closed and sealed compartment for the pilot which can be placed under pressure and supplied with oxygen in order to maintain him at his maximum efficiency under trying conditions.

The fuselage or body of the aircraft represented at 10 is of substantially true tear drop form. It is everywhere circular in transverse section, and in longitudinal section it corresponds, in every plane passing through the longitudinal axis, to the N. A. C. A. .0030 air-foil, although in cases where less volume of fuselage is desirable some N. A. C. A. air-foil of greater length to diameter ratio may be used. The air-foil form illustrated has a length to thickness ratio of about 3⅓:1. The only deviation from the N. A. C. A. air-foil is a slight increase in length produced by a minor extension and sharpening of the nose to better accommodate the flow of air over the surface at the extremely high speeds of which the present craft is capable. Extreme care should be taken to eliminate all parasitic resistances, so that landing gear and the like should be completely retractable.

To ensure a uniform flow of air over the surface of this air-foil body, which will act as an insulating blanket against the friction of the atmosphere through which it is passing, it is at least provided with a nose propeller 18 driven by a suitable power plant 25 illustrated. If more than this one propeller is used, this one should be associated with the engine of maximum power. Where high speeds are desirable, the tail propeller 21 is essential since it ensures a smooth flow of air over the converging rear surfaces of the fuselage and promotes a smooth clean flow from the tail preventing a following suction or vacuum area which would not only seriously interfere with the smooth flow of air and hence the high speed, but would contribute to instability and make the control of the craft exceedingly difficult. It is to be noted that the nose and tail propellers revolve about axes which are coincident with the longitudinal axis of the fuselage so that the air is uniformly distributed about the whole surface of the same.

To provide a part or all of the support for the aircraft it is provided with a pair of wing surfaces 11 and 12, respectively, which project laterally from the same in the region of greatest diameter. They preferably spring from the greatest horizontal width of the craft as illustrated in Figures 1 and 2 and may be said, therefore, to contain or house at least portions of the extensions of the greatest horizontal diameter of the fuselage. Where it is found desirable, the main supporting wings may be equipped with apparatus such as illustrated in my earlier United States Patent No. 1,790,923, granted February 3, 1931 for Aircraft which is capable of changing the angle of attack of the wings in accordance with the occasion, such as climbing, descending, travelling at high speed on the level, and so forth, as will be well understood. These wings are of conventional air-foil section and may have any suitable shape in plan and any necessary dihedral angle found desirable for stability. The wings as illustrated are equipped with conventional ailerons 13 and wing flaps 13' as is common in present-day aircraft.

Stabilization of flight is effected by the rear or stabilizer surfaces 14 and 15. As shown in Figure 2, these surfaces are of suitable air-foil section and may or may not contribute to the actual lifting effect due to forward movement. In any event, it is preferred to have these surfaces extend in a substantially horizontal plane extending from the median center of the fuselage. If desired, a variable angle of attack may be imparted to these control surfaces if it is found necessary, by apparatus such as described and illustrated in the above identified patent. Portions of the rear edge of each of the stabilizer surfaces 14 and 15 are fitted with or formed into an elevator or horizontal rudder 27 and 28 of suitable dimensions to provide the desired control of the craft for rising or descending. In addition, each stabilizer surface 14 and 15 is equipped with an aileron near its outer end as shown at 29 and 30.

Suitable control means, not shown but including the horns 31 on each of the control surfaces, is provided whereby the elevators 27 and 28 are moved in unison for the normal ascending and descending movements of the craft, while the ailerons 29 and 30 are primarily associated for operation in opposite directions as are the normal ailerons on the wings of this and other aircraft for controlling the banking action and for correcting tilting when undesired. Under certain conditions, however, the stabilizer ailerons are arranged for movement both in the same direction so that they can be similarly disposed out of the plane of the stabilizer either oppositely to the flaps or elevators or in the same direction and together with them act to impart speed retardation or braking for slowing up the craft in landing, coming out of dives and the like.

The ailerons and flaps 13, 13' on the main wings are arranged also for control as just described in connection with those on the stabilizer surfaces so that not only is the retardation available from the flaps as in conventional operation, but it can be augmented by moving both ailerons in the same direction as the flaps if additional lift is required when slowing down, or they can be moved in the opposite direction to counteract the lifting action of the flaps. The structural features of the control mechanism for manipulating the ailerons, wing flaps and stabilizer control surfaces form no part of the present invention. Numerous mechanisms suitable for or readily modified to handle the control surfaces are already known. One such mechanism, which needs only to be duplicated, is illustrated in the patent to Johnson, 2,303,695, for Differential rudder for airplanes.

Each stabilizer surface, in the form of the invention illustrated in Figures 1 and 2, is equipped with a pair of vertical fins 35 and 36 preferably symmetrically disposed one above and one below this surface. These fins do not have their planes extending fore and aft, but they diverge to some extent from the fore and aft axis of the fuselage as illustrated since these fin surfaces are fairly close to the converging tail of the fuselage and are therefore subjected to the air stream following the same. Because of their lateral displacement from this surface, however, their planes are not parallel to a tangent plane to the adjacent surface, but rather it might be said that each of their planes substantially bisects the angle between this tangent plane and a fore and aft vertical plane.

Each of the fin surfaces is equipped with a rearwardly extending flap or vertical rudder 37 and, in addition, with a vertical fin aileron 38. The rudders 37 are connected with suitable controls for movement in unison to provide for lateral turning of the aircraft in the conventional manner. The ailerons 38, however, are arranged to be independently operated so that they can be oppositely disposed to assist in spiral maneuvers of the aircraft when they act in conjunction with the main wing and stabilizer surface ailerons. They may also be moved in unison and opposite to the movement of the rudders to provide additional retardation surfaces for further slowing up the craft under the conditions explained in connection with the stabilizer ailerons.

Where additional propulsion force is required to achieve the speed desired, it may be provided by the additional propellers 19 driven by the motors 25 largely housed in the leading edges of the wing 11. Still further propulsive power may be provided by a further pair of propellers 20 driven by the motors 25 housed at the junction of the stabilizer surfaces and the vertical fin surfaces. The axes of rotation of these propellers are coincident with the line of intersection of the vertical fin surfaces with the horizontal stabilizer surfaces for the same reasons as pointed out for the inclination of the vertical fin surfaces to the fore and aft axis of the fuselage. Additionally, it is desired that the slip stream from the propellers 20 be uniformly disposed on the two sides of the fin surfaces and of the stabilizer surfaces. It will also be apparent that the slip streams from the propellers 19 will be uniformly divided between the upper and lower faces of the main wings.

The disposition of the various propellers about the fuselage is extremely important. It will be noted from Figure 1 that the propellers 19 are equidistantly spaced from the longitudinal axis of the fuselage and that a line connecting them intersects this axis at a distance behind the front propeller 18 substantially equal to the distance from the axis to either propeller 19. The distance between the transverse line connecting the propellers 19 and the transverse line connecting the propellers 20 is twice that of the distance from the line connecting the propellers 19 to the propeller 18. The propellers 20 are equidistant from the center line of the fuselage and are each spaced laterally from the center line a distance substantially equal to the fore and aft distance from the line connecting the propellers 20 to the propeller 21.

Obviously the mode of propeller disposition just defined has a definite bearing to the length to thickness ratio of the fuselage and if other ratios than that suggested are used, then a different disposition of propellers is essential in order to provide for the desired air flow along the fuselage surface. In connection with the several propulsion means it is to be noted that all of the propellers are not essential to satisfactory operation, but certain of them are much more important than others. The nose propeller is perhaps the most important of the group since it initiates the flow of clinging air blanket and assures that the most important nose section of the plane which drives into the atmosphere is properly shielded from the same and the resistance to forward flight decreased. Where high speeds are desired the tail propeller is of prime importance since it increases the speed at a much greater ratio than the increase in horsepower necessary to operate the same. The function of this propeller is to gather the clinging air blanket from the rear portion of the fuselage and drive it smoothly and at increasing speed to the rear in a small compact stream eliminating burbling or the formation of eddies and vacuums behind the craft. This tail propeller should operate at a higher speed or have a greater pitch than the forward propeller to ensure a continuous clean flow of air.

Following the nose and tail propellers, the main wing propellers are next in importance and if they are properly positioned as previously described, they provide a uniform flow of air above and below the main wings permitting a reasonably equal distribution of lift between the top and bottom surfaces of the same. At the same time they direct a slip stream rearwardly over the stabilizers and vertical fins permitting these control surfaces to be more effective and to be made smaller for the performance of equal duties.

For maximum maneuverability the propellers 20 carried by the control surfaces are advisable. Their location is such that they distribute their slip streams equally over the upper and lower surfaces of the stabilizers and the left and right surfaces of both the upper and lower portions of the vertical fins. With these motors in operation, maneuverability of the type required for fighter planes is greatly enhanced. When used with the improved control surfaces of the present invention acrobatics of a type not heretofore contemplated are feasible and fighter planes are able to travel in courses almost impossible to be followed by anti-aircraft fire.

Figure 3 has been prepared to illustrate in a general way the flow of air over the fuselage of the type proposed in accordance with the present invention. In this case the showing is schematic and the nose propeller 18 is illustrated, by means of a plurality of arrows, as drawing in the air from laterally and forwardly of the moving craft and compressing the same into a rearwardly travelling clinging blanket or isolating covering 40 which, assisted by the other propellers, follows closely along the smooth streamline surface of the fuselage until it is gathered together by the tail propeller 21 and forced rearwardly in a narrow smooth stream 42 which materially enhances the speed of movement of the craft. Any supplementary propellers such as those illustrated at 19 and corresponding to the wing propellers of Figure 1 gather in air as illustrated by the arrows in front of them and deliver it rearwardly in a more or less diverging blast travelling substantially parallel to the line of flight of the craft. Portions of this blast diverge and eventually converge with the blanket 40 travelling along the surface of the fuselage. Other portions of the same impinge upon the top and bottom surfaces of the stabilizers and on the vertical surfaces of the fins to provide for improved control.

In Figures 4 and 5 are illustrated in plan and elevation, respectively, a modified form of stabilizer and control unit. In Figure 4 the horizontal stabilizers are shown at 50 and 51 and substantially the whole rear portions of the same are divided into the flaps or elevators 53 and 54 and the ailerons 55 and 56, control for which is had in a more or less conventional manner by wires or the like connected to the horns 60. The type of control for these, permitting independent or joint operation of the same, is like that described in connection with Figures 1 and 2.

The vertical fin surface is restricted, however, to a single unit having a portion 62 above the stabilizer and a like portion 63 below the same. These two stationary portions together are in the form of a large isosceles triangle of low altitude. Hinged to the straight vertical edge at the rear of this are a pair of symmetrical rudders 64 and 65 cut out as at 66 to provide clearance for movement of the elevators. Above and below the elevators are the fin ailerons 68 and 69 again controllable as described in connection with the vertical control surfaces of Figures 1 and 2. The form of control surfaces illustrated in Figures 4 and 5 is preferably used where only four propellers disposed as illustrated in Figure 3 are required for the desired speed of the craft being constructed.

In Figures 4 and 5, each of the movable control surfaces, both vertical and horizontal, is shown as equipped with a tab 70, the purpose of which is to permit these control surfaces to be maintained in line with the corresponding stationary portions and yet to have suitable trimming available to balance or adjust the ship to horizontal flight in spite of eccentric loading or the like. These tabs may be arranged to be controlled in any conventional manner.

As previously mentioned, the fuselage may be used as a compartment to hold a buoyant gas in which case it should provide only a small fraction of the total lift for the craft, the remainder being provided by adequately sized wings designed in relation to the forward speed. It is undesirable to have too great lift from buoyant gas since this reduces the maneuverability and controllability of the craft to an objectionable extent. In many cases it will not be desired to use any buoyant gas and all of the compartments within the fuselage may be used for operating mechanism, passenger or cargo space, explosives or the like. The shape and size of the fuselage are dictated by the requirements of air foil shape rather than by the requirements of cargo space, space for buoyant gas, etc.

Where the craft illustrated is to be used as an automatic type bomb the lifting gas can well be of the explosive variety such as hydrogen, "pink lady" and other burning gases which will contribute to the explosibe character of the bomb which will naturally carry, in addition, high explosives such as blasting gelatin, TNT, and other of the more violent disruptive materials. Most of these gases are not explosive until mixed with air but will burn violently, thereby adding incendiarism to the explosive character of the bomb. Such bombs may be controlled automatically by a gyropilot type of apparatus or may be radio controlled following well-known systems. Because of the high velocities to which such bombs may be driven, they can be steered in a trajectory much like that of a projectile reaching beyond the effective range of other types of aircraft and anti-aircraft artillery.

Having thus described the invention, what is claimed as new and desired to be secured by Letters Patent is:

1. In a device of the type described, in combination, a body of substantially true tear drop form throughout, power driven propellers located adjacent the surface of said body and arranged to deliver a rearwardly directed flow of air over the whole of the surface of said body which clings to the same and shields it from the friction of the air body through which it passes, a single set of air-foil wings extending from said body to at least partially support the same as a result of forward motion, each of said wings supporting one of said propellers, a single set of horizontal stabilizers near the tail of said body, each of said stabilizers supporting one of said propellers, and a vertical fin intersecting each stabilizer substantially along the axis of rotation of the stabilizer propeller.

2. In a device of the type described, in combination, a body or fuselage of substantially true tear drop form throughout, a single set of airfoil wings extending laterally from the vertical center of said body forward of the longitudinal center thereof, a single set of horizontal stabilizers in line behind said wings and near the tail of said body, a power driven nose propeller, a power driven propeller adjacent the leading edge of each wing, a power driven, reversible propeller adjacent the leading edge of each stabilizer, and a power driven reversible propeller extending from the tail of said body, the said body containing sufficient lifting gas to provide support for only a fraction of the weight of the complete device, the trailing edge of each wing and stabilizer having an adjustable flap in the propeller stream whereby the device may be caused to hover or move forward at a slow rate by the reverse action of the stabilizer and tail propellers.

3. In an aircraft, in combination, a fuselage, wings providing lift due to forward propulsion, ailerons on said wings, rear stabilizer surfaces positioned to give longitudinal balance to the craft, a pair of elevators on each surface and independently controllable for movement, vertical fin surfaces above and below each of the stabilizers, a pair of rudders of similar area on each fin surface and independently controllable, said duplication of elevators and rudders providing for opposite setting in balanced pairs on opposite sides of the axis of the fuselage to provide speed retardation.

4. In an aircraft, in combination, a fuselage, a combined stabilizer surface and vertical fin surface, each surface being divided into two, symmetrically disposed sections each of said sections having two trailing edge flaps, means to actuate each of said flaps independently, and a power driven propeller close to and having its axis of rotation in line with the intersection of said surfaces.

5. In an aircraft, in combination, a fuselage of tear drop form having a longitudinal section in any plane conforming to the N. A. C. A. .0030 airfoil, wing surfaces extending from the fuselage near the largest diameter thereof, stabilizer surfaces extending laterally from the mid-section of said fuselage near the tail thereof, a vertical fin surface extending above and below each of said stabilizer surfaces and inclined to the axis of the fuselage but at an angle less than that of the adjacent fuselage surface, and power driven propellers each having its axis of rotation at the intersection of the stabilizer and vertical fin surfaces.

JOHN W. S. HODGDON.